(12) United States Patent
Yan et al.

(10) Patent No.: US 12,466,257 B2
(45) Date of Patent: Nov. 11, 2025

(54) DISPLAYING METHOD AND DISPLAYING SYSTEM FOR VEHICLE

(71) Applicants: Hyundai Motor Company, Seoul (KR); Kia Corporation, Seoul (KR)

(72) Inventors: Xiao Jia Yan, Whasung-Si (KR); Jin Young Lee, Whasung-Si (KR); Da Lin Zheng, Whasung-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 231 days.

(21) Appl. No.: 18/197,535

(22) Filed: May 15, 2023

(65) Prior Publication Data

US 2024/0140200 A1    May 2, 2024

(30) Foreign Application Priority Data

Oct. 26, 2022    (CN) .......................... 202211318015.3

(51) Int. Cl.
*B60K 35/00*    (2024.01)
*B60K 35/10*    (2024.01)
(Continued)

(52) U.S. Cl.
CPC .............. *B60K 35/00* (2013.01); *B60K 35/10* (2024.01); *B60K 35/28* (2024.01); *B60K 35/80* (2024.01);
(Continued)

(58) Field of Classification Search
CPC ........ B60K 35/00; B60K 35/10; B60K 35/28; B60K 35/80; B60K 2360/115;
(Continued)

(56) References Cited

U.S. PATENT DOCUMENTS 9,648,107 B1 *   5/2017  Penilla ................ G06F 3/04886
2011/0035099 A1 * 2/2011  Kobayashi ............... G09G 5/10
                                                                345/690

(Continued)

FOREIGN PATENT DOCUMENTS

CN       113212450 A  *  8/2021  ............ B60W 50/14
KR       10-2313790 B1    10/2021
WO       WO-2015154266 A1 * 10/2015  ............. G10L 15/22

*Primary Examiner* — Dale W Hilgendorf
*Assistant Examiner* — Frank T Glenn, III
(74) *Attorney, Agent, or Firm* — Morgan Lewis & Bockius LLP (57) ABSTRACT

A displaying method and a displaying system for a vehicle, include obtaining a current date; determining whether to set an image of a holiday or anniversary to be displayed on a display of the vehicle by providing a display setting option to select or not to select a display setting option of a user; providing a display setting option and receiving a user's selection of the display setting option; when the display setting option is selected, comparing the obtained current date with preset holiday data and/or the preset anniversary data to determine whether the current date is a holiday corresponding to the preset holiday data, or determine whether the current date is an anniversary corresponding to the preset anniversary data; and displaying a pre-stored image related to the holiday and/or anniversary of the current date on a display of the vehicle.

14 Claims, 10 Drawing Sheets

(51) Int. Cl.
*B60K 35/28* (2024.01)
*B60K 35/80* (2024.01)

(52) U.S. Cl.
CPC ... *B60K 2360/115* (2024.01); *B60K 2360/167* (2024.01); *B60K 2360/349* (2024.01)

(58) Field of Classification Search
CPC ........ B60K 2360/167; B60K 2360/349; B60K 35/22; B60K 35/29; B60Y 2400/92
See application file for complete search history.

(56) References Cited

U.S. PATENT DOCUMENTS

| 2012/0293532 | A1* | 11/2012 | Armbrust | B60K 35/28 |
| | | | | 345/589 |
| 2014/0292805 | A1* | 10/2014 | Yamada | G09G 5/00 |
| | | | | 345/629 |
| 2016/0078603 | A1* | 3/2016 | Hirai | G09G 5/28 |
| | | | | 345/647 |
| 2016/0314120 | A1* | 10/2016 | Dauderman | G06F 16/908 |
| 2020/0065061 | A1* | 2/2020 | Jiang | G06F 3/167 |
| 2022/0035156 | A1* | 2/2022 | Helot | B60K 35/60 |

* cited by examiner

DISPLAYING METHOD AND DISPLAYING SYSTEM FOR VEHICLE

CROSS-REFERENCE TO RELATED APPLICATION

The present application claims priority to and the benefit of Chinese Patent Application No. 202211318015.3 filed in the Chinese National Intellectual Property Administration on Oct. 26, 2022, the entire contents of which is incorporated herein for all purposes by this reference.

BACKGROUND OF THE PRESENT DISCLOSURE

Field of the Present Disclosure

The present disclosure relates to a field of vehicle technology, and more particularly, to a displaying method and a displaying device for a vehicle.

Description of Related Art

Recently, vehicles have been developed to have multiple displays. For example, to transmit information to a driver and passengers of a vehicle, a head-up display (HUD) is mounted on a driver's seat in addition to a cluster and a main unit of the vehicle, and displays are additionally provided on a passenger seat and rear seats. For example, a vehicle's audio video navigation telematics (AVNT) system outputs a graphical user interface (GUI) on these displays to allow a user to interact with navigation, communication, entertainment, or other non-safety-critical functions of the vehicle. As people's demand for vehicle intelligence increases, users have also become relatively interested in the GUI.

For example, a conventional in-vehicle GUI notification function notifies only some common holidays, has no notification function for specific holidays (i.e., anniversaries), has no function to display specific images for these holidays and anniversaries, and therefore, may be improved.

The description of the background art is only provided for convenience for deep understanding of the technical solution (technical means used, technical problems to be solved, technical effects to be generated, etc.) of the present disclosure, and it is not to be taken as an admission or implied that the information forms related art known to those skilled in the art.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a displaying method and a displaying device configured for a vehicle having advantages of providing a delicate and interesting visual experience, and highlighting atmosphere and environment of holidays and anniversaries to satisfy personalized needs of users by comparing a current date with preset holiday or anniversary data to determine whether the current date is holidays or anniversaries and displaying images related to the holidays or the anniversaries if the current date is the holidays or the anniversaries, otherwise displaying an image related to current weather.

Various aspects of the present disclosure are directed to providing a displaying method for a vehicle, including: obtaining a current date; determining whether to set an image of a holiday or anniversary to be displayed on a display of the vehicle by providing a display setting option to select or not to select a display setting option of a user; providing a display setting option and receiving a user's selection of the display setting option; when the display setting option is selected, comparing the obtained current date with preset holiday data or the preset anniversary data to determine whether the current date is a holiday corresponding to the preset holiday data, or determine whether the current date is an anniversary corresponding to the preset anniversary data; and displaying a pre-stored image related to the holiday or anniversary of the current date on a display of the vehicle when the controller concludes that the current date is the holiday corresponding to the preset holiday data or the current date is the anniversary corresponding to the preset anniversary data.

The displaying method may further include: obtaining current weather; and displaying a pre-stored image related to the current weather on the display of the vehicle when the controller concludes that the current date is neither the holiday corresponding to the preset holiday data nor the anniversary corresponding to the preset anniversary.

The preset anniversary data may include at least a name of the anniversary, a date of the anniversary, and whether the date of the anniversary is set as a lunar calendar date or a solar calendar date.

The displaying method may further include presetting the anniversary data. The presetting the anniversary data may include: providing an anniversary setting option so that a user receives an operation command for selecting the anniversary setting option; providing a setting for inputting the name of the anniversary to receive the name of the anniversary input by the user; providing a setting option for selecting whether the anniversary date is stored as the lunar calendar date or the solar calendar date so that the user receives an operation command for selecting whether the anniversary date is the lunar calendar date or the solar calendar date; providing a setting for inputting the date of the anniversary to receive the date of the anniversary input by the user; and providing a setting option for adding an anniversary.

The comparing the obtained current date with preset holiday data or preset anniversary data may include: determining whether the date of the holiday in the preset holiday data or the date of the anniversary in the preset anniversary data is set as a lunar calendar date or a solar calendar date; and converting the obtained current date into the lunar calendar date and comparing the converted lunar calendar date with the date of the holiday or the date of the anniversary set as the lunar calendar date, when the controller concludes that the date of the holiday or the date of the anniversary is set as the lunar calendar date.

The displaying method may further include adjusting brightness of the pre-stored image displayed on the display of the vehicle.

The displaying method may further include displaying a traveling speed of the vehicle on the display of the vehicle.

The displaying method may further include blurring the pre-stored image displayed on the display of the vehicle according to a traveling speed of the vehicle.

The blurring the pre-stored image displayed on the display of the vehicle according to the traveling speed of the vehicle may include: obtaining a current traveling speed of the vehicle; determining a blur value, which is numerical value between 0 and 1, according to the traveling speed of the vehicle; and blurring the pre-stored image displayed on the display of the vehicle according to the determined blur value.

The determining the blur value, which is the numerical value between 0 and 1, according to the traveling speed of the vehicle may include: determining the blur value as a ratio of a difference between the traveling speed of the vehicle and a first predetermined threshold to a difference between a second predetermined threshold and the first predetermined threshold when the traveling speed of the vehicle is greater than or equal to the first predetermined threshold and less than the second predetermined threshold which is greater than the first predetermined threshold; and setting the blur value to 1 when the traveling speed of the vehicle is greater than or equal to the second predetermined threshold.

Various aspects of the present disclosure are directed to providing a displaying system for a vehicle, including: a memory configured to pre-store an image related to a holiday, an anniversary, or weather; provide a display setting option to receive a user's selection of the display setting option; when the display setting option is selected, compare the obtained current date with preset holiday data or preset anniversary data to determine whether the current date is a holiday corresponding to the preset holiday data or whether the current date is an anniversary corresponding to the preset anniversary data; and display a pre-stored image related to the holiday or the anniversary of the current date on a display of the vehicle when the controller concludes that the current date is the holiday corresponding to the preset holiday data or the current date is the anniversary corresponding to the preset anniversary data.

The controller may be further configured to: obtain current weather; and display a pre-stored image related to the current weather on the display of the vehicle when the controller concludes that the current date is neither the holiday corresponding to the preset holiday data nor the anniversary corresponding to the preset anniversary.

The preset anniversary data may include at least a name of the anniversary, a date of the anniversary, and whether the date of the anniversary is set as a lunar calendar date or a solar calendar date.

When presetting the anniversary data, the controller may be configured to: provide an anniversary setting option so that a user receives an operation command for selecting the anniversary setting option; provide a setting for inputting the name of the anniversary to receive the name of the anniversary input by the user; provide a setting option for selecting whether the anniversary date is stored as the lunar calendar date or the solar calendar date so that the user receives an operation command for selecting whether the anniversary date is the lunar calendar date or the solar calendar date; provide a setting for inputting a date of the anniversary to receive a date of the anniversary input by the user; and provide a setting option for adding the anniversary.

The controller may be configured to: determine whether the date of the holiday in the preset holiday data or the date of the anniversary in the preset anniversary data is set as a lunar calendar date or a solar calendar date; convert the obtained current date into the lunar calendar date when the controller concludes that the date of the holiday or the date of the anniversary is set as the lunar calendar date; and compare the converted lunar calendar date with the date of the holiday or the date of the anniversary set as the lunar calendar date.

The controller may be configured to adjust brightness of the pre-stored image displayed on the display of the vehicle.

The controller may be configured to control the display of the vehicle to display a traveling speed of the vehicle.

The controller may be configured to blur the pre-stored image displayed on the display of the vehicle according to a traveling speed of the vehicle.

The controller may be configured to: obtain a current traveling speed of the vehicle while blurring the pre-stored image displayed on the display of the vehicle according to the traveling speed of the vehicle; determine a blur value, which is numerical value between 0 and 1, according to the traveling speed of the vehicle; and blur the pre-stored image displayed on the display of the vehicle according to the determined blur value.

When calculating the blur value, which is numerical value between 0 and 1, according to the traveling speed of the vehicle, the controller may be further configured to: determine the blur value as a ratio of a difference between the traveling speed of the vehicle and a first predetermined threshold to a difference between a second predetermined threshold and the first predetermined threshold when the traveling speed of the vehicle is greater than or equal to the first predetermined threshold and less than the second predetermined threshold which is greater than the first predetermined threshold; and set the blur value to 1 when the vehicle speed is equal to or greater than the second predetermined threshold.

The present disclosure utilizes the above technical solution, and includes the following advantageous effects.

It is possible to display an image related to a holiday or an anniversary, otherwise displaying an image related to current weather by obtaining a current date and comparing the current date with preset holiday and anniversary data to determine whether the current date is the holiday or the anniversary. Such the images related to the holidays, the anniversaries, and the weather can provide delicate and interesting visual experience and highlight the atmosphere and the environment of the holidays and the anniversaries, satisfying the personalization needs of users. In emotional aspect, it is possible for the users to experience rich and high-quality visual experiences, and provide the users with pleasure of driving life by holiday atmosphere and romantic atmosphere. In functional aspect, it is possible to satisfy the personalization needs of the users by generating a driver-vehicle interaction with a more individualized and friendly GUI experience.

The displaying device not only is configured for displaying the image to the current user when the current date is the holiday, but is also configured for displaying the image to the user when the current date is the anniversary. Furthermore, each user edits the anniversary data and stores the name and the date of the anniversary in the anniversary data, sharing congratulations between the users.

The displayed image is blurred or sharpened according to a vehicle traveling speed, providing a driver with a unique visual effect and driving experience.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, a various exemplary embodiments of the present disclosure will be described in detail, and the exemplary embodiment of the present disclosure is implemented on the premise of the technical solution of the present disclosure, and the detailed implementation method and specific operation process are disclosed, but the protection scope of the present disclosure is not limited to the following embodiment.

Figure 1:
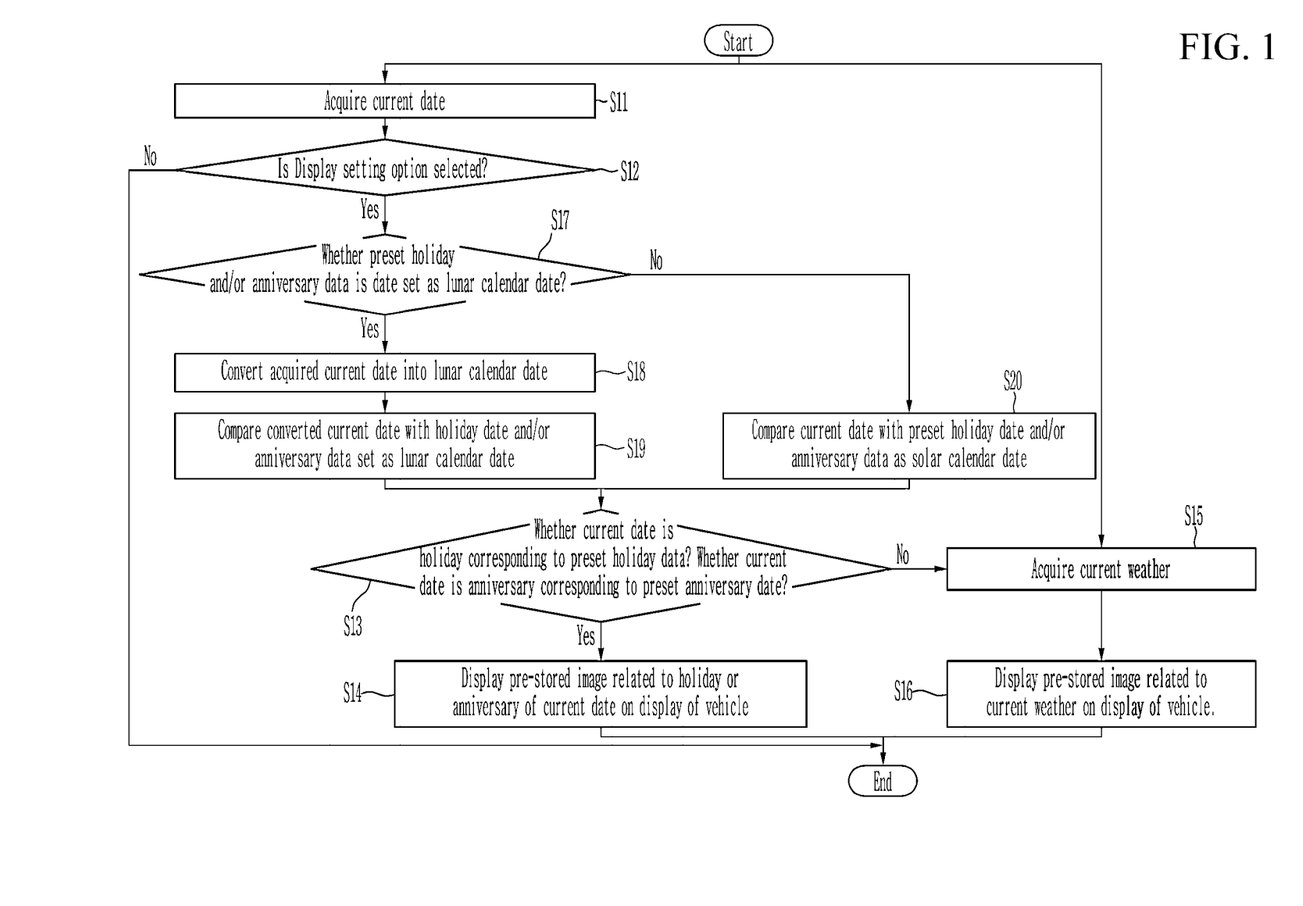
FIG. 1 is a diagram illustrating a flowchart of a displaying method for a vehicle according to various exemplary embodiments of the present disclosure.

FIG. 1 is a diagram illustrating a flowchart of a displaying method for a vehicle according to various exemplary embodiments of the present disclosure.

As illustrated in FIG. 1, the displaying method for the vehicle according to the exemplary embodiment of the present disclosure includes obtaining a current date in step S11 and obtaining current weather in step S15. Global positioning system (GPS) information is collected in an audio video navigation telematics (AVNT) system. The GPS information may include the current date and time. The weather information may be provided, for example, via a map software (e.g., BAIDU Maps) in data communication with the AVNT system for navigation functions and the like.

According to the exemplary embodiment of the present disclosure, the displaying method for the vehicle includes providing a display setting option and determining whether to set an image of a holiday or an anniversary to be displayed on a display of the vehicle by user's selecting or not selecting the display setting option at step S12. The step S12 may be realized in the AVNT system of the vehicle.

Figure 2:
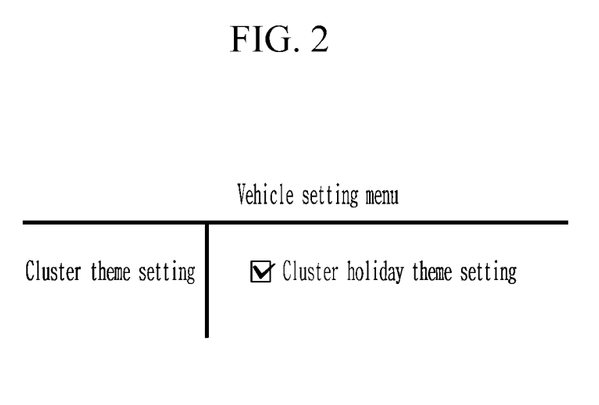
FIG. 2 is a schematic diagram illustrating an example of a display setting option.

FIG. 2 is a schematic diagram illustrating an example of the display setting option. As illustrated in FIG. 2, the display setting option may be displayed as a "cluster holiday theme setting" option, and may also be provided in a "vehicle setting menu" item. A user may select the "set cluster holiday theme" option. The option may be checked through touch, but the exemplary embodiment of the present disclosure is not limited thereto. When a user checks the "cluster holiday theme setting" option, it means that the image of the holiday or the anniversary is displayed on a cluster of the vehicle (i.e., the display of the cluster). When a user does not check the "cluster holiday theme setting" option, it means that the image of the holiday or the anniversary is not displayed on the cluster of the vehicle.

When the display setting option is selected ("Yes" in the step S12), the obtained current date is compared with preset holiday data and/or preset anniversary data to determine whether the current date is the holiday corresponding to the preset holiday data, or determine whether the current date is the anniversary corresponding to the preset anniversary data in step S13. A pre-stored image related to the holiday and/or the anniversary of the current date is displayed on the display of the vehicle in step S14 when it is determined that the current date is the holiday corresponding to the preset holiday data or the current date is the anniversary corresponding to the preset anniversary data. Through this, it is determined whether the current date is the holiday and/or the anniversary, so that the corresponding image is displayed on the display of the vehicle when it becomes the corresponding date. The display of the vehicle may be the cluster, but the present disclosure is not limited thereto.

According to the exemplary embodiment of the present disclosure, such the images related to the holidays, the anniversaries, and the weather can provide delicate and interesting visual experience and highlight the atmosphere and environment of the holidays and/or the anniversaries, satisfying personalization needs of users. In emotional aspect, it is possible for users to experience rich and high-quality visual experiences, and provide users with pleasure of driving life by holiday atmosphere and romantic atmosphere. In functional aspect, it is possible to satisfy the personalization needs of users by generating a driver-vehicle interaction with a more individualized and friendly GUI experience.

The display method includes displaying a pre-stored image related to the current weather on the display of the vehicle in step S16 when it is determined that the current date is neither the holiday corresponding to the preset holiday data nor the anniversary corresponding to the preset anniversary ("No" in the step S13). Through this, it is determined whether the current date is the holiday and/or the anniversary, and when the current date is not the date corresponding to the holiday and/or the anniversary, the image related to weather is displayed on the display of the vehicle.

Figure 3:
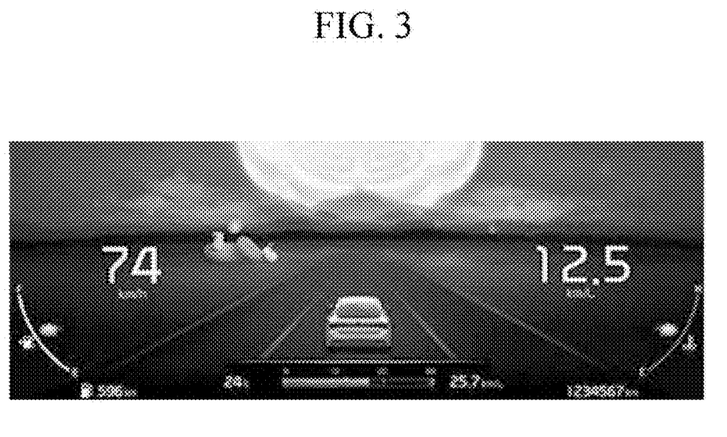
FIG. 3 is a schematic diagram illustrating an image related to Thanksgiving Day displayed in a cluster.
Figure 4:
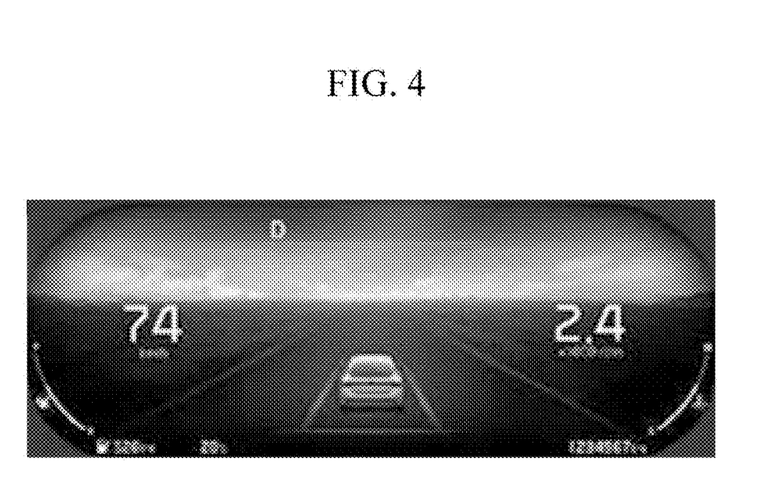
FIG. 4 is a schematic diagram illustrating an image related to sunny weather displayed in a cluster.

FIG. 3 is a schematic diagram illustrating an image related to Thanksgiving Day displayed in the cluster. FIG. 4 is a schematic diagram illustrating an image related to sunny weather displayed in the cluster. As illustrated in FIG. 3 and FIG. 4, in addition to the images related to the Thanksgiving Day or the sunny weather, a traveling speed, an engine speed, an internal temperature of the vehicle, fuel consumption per 100 km, a drivable distance, and/or a total driving distance, and the like may be displayed.

Furthermore, the display method for the vehicle according to the exemplary embodiment of the present disclosure may further include adjusting brightness of the image displayed on the display of the vehicle.

Here, the holidays refer to typical holidays (traditional Chinese holidays such as Spring Festival, New Year's Eve, and Lunar New Year, and Western holidays such as Halloween and Christmas). The holiday data is data in which different holidays is recorded and may be stored in a local memory of the vehicle in an initial state (when the vehicle is manufactured). Because only the typical holidays are stored in the holiday data, each user needs to add the holiday data with some specific date for anniversary information by performing user-customized settings in addition to the holiday data.

According to an exemplary embodiment of the present disclosure, the preset anniversary data may include at least a name of the anniversary, the date of the anniversary, and whether the date of the anniversary is set as a lunar calendar date or a solar calendar date.

Figure 5:
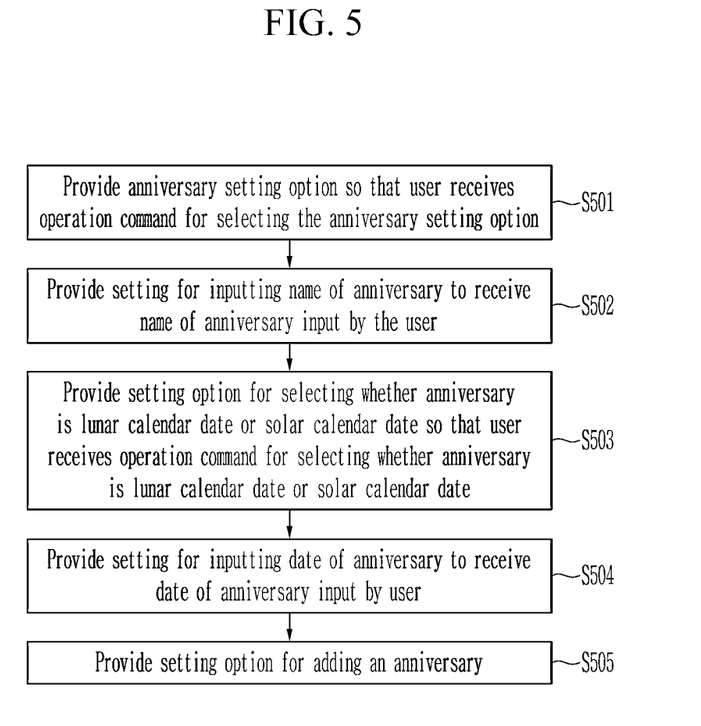
FIG. 5 is a flowchart illustrating a method of presetting anniversary data according to various exemplary embodiments of the present disclosure.

FIG. 5 is a flowchart illustrating a method of presetting anniversary data according to the exemplary embodiment of the present disclosure. As illustrated in FIG. 5, the presetting of the anniversary data may include: providing an anniversary setting option to receive an operation command for selecting the anniversary setting option from a user in step S501; providing a setting for inputting the name of the anniversary to receive the name of the anniversary input from the user in step S502; providing a setting option for selecting whether the anniversary date is the lunar calendar date or the solar calendar date to receive an operation command for selecting whether the anniversary is the lunar calendar date or the solar calendar date from the user in step S503; providing a setting for inputting the date of the anniversary to receive the date of the anniversary input from the user in step S504; and providing a setting option for adding an anniversary in step S505. The method of presetting the anniversary data may be realized in the AVNT system of the vehicle.

Figure 6:
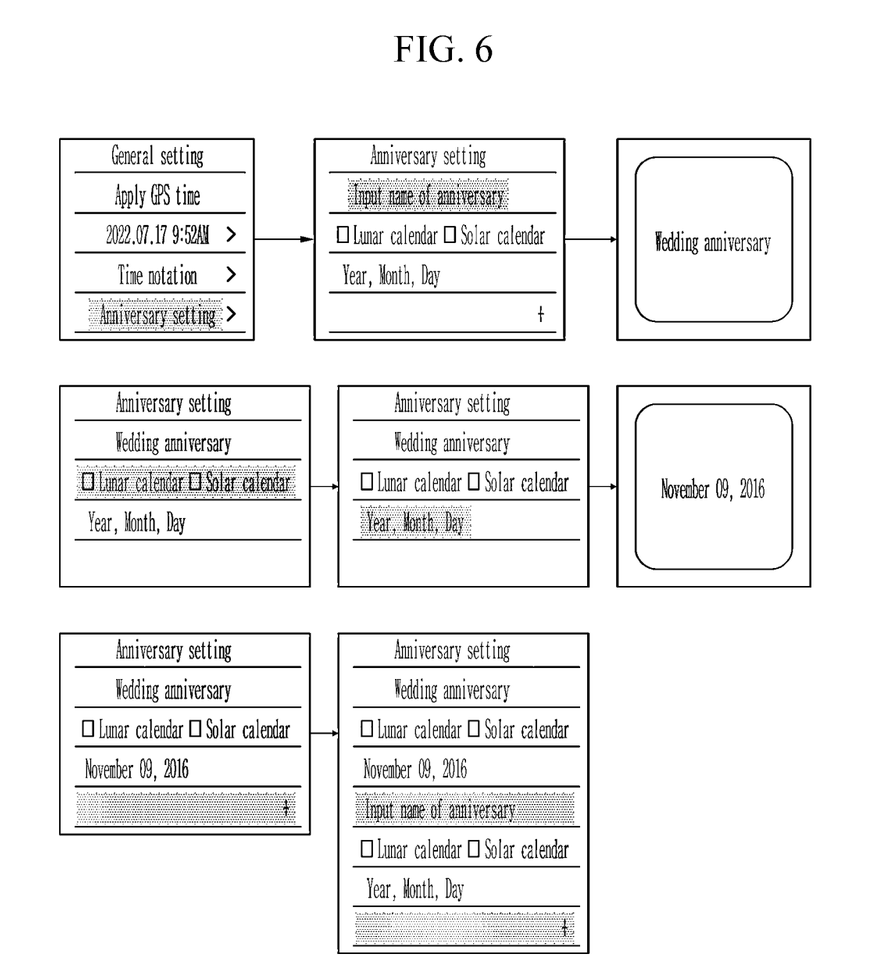
FIG. 6 is a schematic diagram illustrating a process of presetting anniversary data in an AVNT system.

FIG. 6 is a schematic diagram illustrating a process of presetting the anniversary data in the AVNT system. As illustrated in FIG. 6, a user may select "anniversary setting" to input the name of the anniversary, select a "lunar calendar date" or a "solar calendar date," and input the date of the anniversary sequentially, completing the presetting of the anniversary data. When the user wants to add the anniversary, the user selects the sign "+" displayed in the image at the bottom left in FIG. 6.

Considering that the holidays and/or the anniversaries may be determined in different ways, some cases may be based on the solar calendar, while others may be based on the lunar calendar. For example, Spring Festival, New Year's Eve, Lunar New Year's Eve, Qixi Festival, Laba Festival (December 8 in the lunar calendar), Double Ninth Festival, Dano Festival, Thanksgiving Day, and some birthdays stored in the anniversary data are all determined according to the lunar calendar, and holidays such as solar New Year, Labor Day, National Day, and some other birthdays stored in the anniversary data are all determined according to the solar calendar. To the present end, according to the exemplary embodiment of the present disclosure, the comparing of the obtained current date with the preset holiday data and/or the preset anniversary data includes determining whether the date of the holiday among the preset holiday data and the date of the anniversary among the preset anniversary data are set as the lunar calendar date in step S17. When it is determined that the date of the holiday or the date of the anniversary is set as the lunar calendar date ("Yes" in the step S17), the obtained current date is converted into the lunar calendar date in step S18, and the converted lunar date is compared with the date of the holiday and/or the anniversary set as the lunar calendar date in step S19. When it is determined that the date of the holiday and/or the date of the anniversary is set as the solar calendar date ("No" in the step S17), the obtained current date is compared with the date of the holiday and/or the date of the anniversary set as the solar calendar date in step S20.

In various exemplary embodiments of the present disclosure, the current date may be obtained through a GPS time system when the vehicle is started. Furthermore, a time conversion algorithm may be stored in the vehicle. After obtaining the current date through the GPS time system, the obtained current date is converted into the lunar calendar date. Thereafter, the converted lunar calendar date is compared with the preset holiday and/or the anniversary data, and thus, it is possible to accurately determine whether the current date is the holiday and/or the anniversary.

According to the exemplary embodiment of the present disclosure, the displaying method for the vehicle further includes displaying the traveling speed of the vehicle on the display of the vehicle. The traveling speed of the vehicle illustrated in FIG. 3 and FIG. 4 is 74 km/h.

Figure 7:
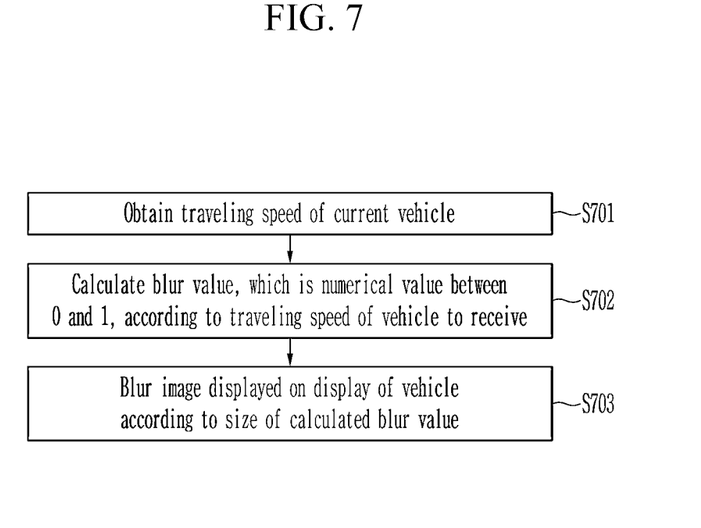
FIG. 7 is a flowchart illustrating a method of blurring an image displayed on a display of a vehicle depending on a traveling speed of a vehicle according to various exemplary embodiments of the present disclosure.

Furthermore, the display method for the vehicle according to the exemplary embodiment of the present disclosure may further include blurring the image displayed on the display of the vehicle according to the traveling speed of the vehicle. FIG. 7 is a flowchart illustrating a method of blurring the image displayed on the display of the vehicle depending on the traveling speed of the vehicle according to the exemplary embodiment of the present disclosure. As illustrated in FIG. 7, the method of blurring the image displayed on the display of the vehicle depending on the traveling speed of the vehicle may include: obtaining a current traveling speed of the vehicle in step S701; determining a blur value, which is numerical value between 0 and 1 according to the traveling speed of the vehicle in step S702; and blurring the image displayed on the display of the vehicle according to the determined blur value in step S703.

The method of obtaining the current traveling speed of the vehicle may generally detect a real-time rotation speed of a wheel using a wheel speed sensor and determine the traveling speed of the vehicle through an average value of the real-time wheel rotation speed, but the present disclosure is not limited thereto.

When determining the blur value, which is the numerical value between 0 and 1 according to the traveling speed of the vehicle, if the traveling speed of the vehicle is greater than or equal to a first predetermined threshold and less than a second predetermined threshold greater than the first predetermined threshold, the blur value is a ratio of a difference between the traveling speed of the vehicle and the first predetermined threshold to a difference between the second predetermined threshold and the first predetermined threshold, and satisfies the following expression.

$$\text{Blur value} = (\text{traveling speed of vehicle} - \text{first predetermined threshold})/(\text{second predetermined threshold} - \text{first predetermined threshold})$$

When the traveling speed of the vehicle is greater than or equal to the second predetermined threshold, the blur value is set to 1.

For example, the first predetermined threshold may be 0 km/h, the second predetermined threshold may be 100 km/h, and when the traveling speed of the vehicle is 74 km/h, the blur value is 0.74, and when the traveling speed of the vehicle is 100 km/h or more, the blur value is 1.

Figure 8A:
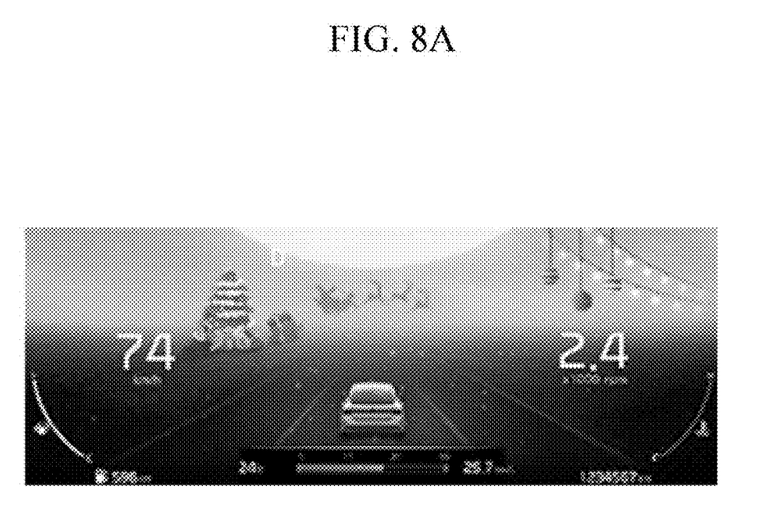
FIG. 8A and FIG. 8B are schematic diagrams illustrating images displayed on a display of a vehicle before and after blurring.
Figure 8B:
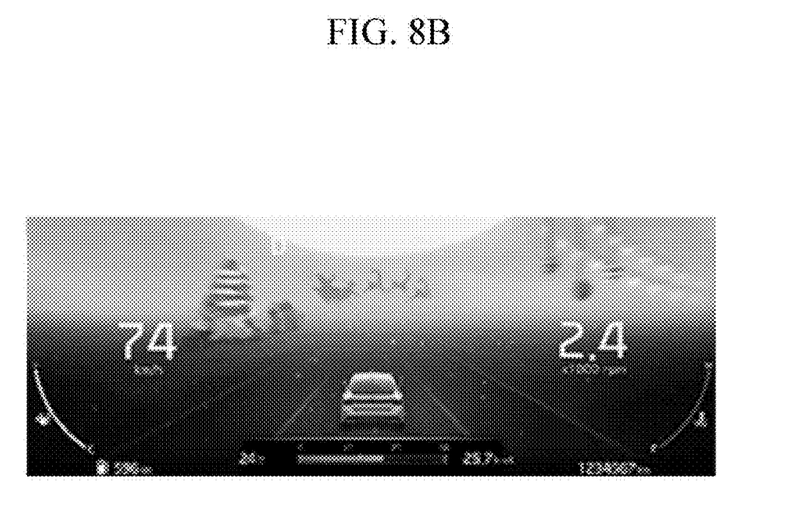

Accordingly, the closer the blur value is to 0, the sharper the image may be, and the closer the blur value is to 1, the blurrier the image may be. When the blur value is 0, the blurring process is not performed on the image. When the blur value is 1, a degree of the blurring process used for the image is the greatest. FIG. 8A and FIG. 8B are schematic diagrams illustrating the images displayed on the display of the vehicle before and after the blurring process. As illustrated in FIGS. 8A and 8B, the image on the display is blurred or sharpened based on the traveling speed of the vehicle to provide a unique visual effect and driving experience to a driver.

Figure 9:
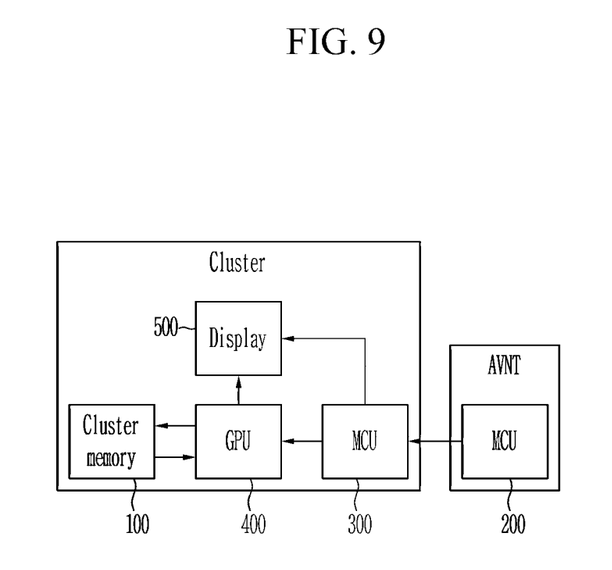
FIG. 9 is a block diagram illustrating a configuration of a displaying device for a vehicle according to various exemplary embodiments of the present disclosure.

FIG. 9 is a block diagram illustrating a configuration of a displaying system for the vehicle according to various exemplary embodiments of the present disclosure The displaying system for the vehicle according to the exemplary embodiment of the present disclosure includes a memory and a controller. As illustrated in FIG. 9, the memory may be a cluster memory 100, and the controller may include a central processing unit (CPU) 200, a micro programmed control unit (MCU) 300 of a cluster, and a graphics processing unit (GPU) 400 in the AVNT system.

The cluster memory 100 may store the images related to each holiday, anniversary, and/or weather in advance. By effectively using a storage space of the cluster memory 100, it is possible to improve product quality without increasing cost.

The CPU 200 in the AVNT system may obtain the current date and obtain the current weather. The current date and time are included in the GPS information, and the current weather may be obtained through, for example, the BAIDU map.

The CPU 200 in the AVNT system may provide the display setting option, and determine whether to set the image of the holiday or the anniversary to be displayed on the display of the vehicle by user's selecting or not selecting the display setting option. When the display setting option is selected, the CPU 200 in the AVNT system transmits a signal indicating that the user has selected the display setting option to the MCU 300 in the cluster.

According to an exemplary embodiment of the present disclosure, the preset anniversary data may include at least the name of the anniversary, the date of an anniversary, and/or whether the date of the anniversary is set as the lunar calendar date or the solar calendar date. Accordingly, to allow the user to set the anniversary data in advance, the CPU 200 in the AVNT system may provide the anniversary setting option for the user to receive the operation command for selecting the anniversary setting option. The CPU 200 in the AVNT system may provide the setting for inputting the name of the anniversary to receive the name of the anniversary input from the user. The CPU 200 in the AVNT system may provide the setting option for selecting whether the anniversary is the lunar calendar date or the solar calendar date so that the user receives the operation command for selecting whether the anniversary is the lunar calendar date or the solar calendar date.

The CPU 200 in the AVNT system may provide the setting for inputting the date of the anniversary to receive the date of the anniversary input from the user. The CPU 200 in the AVNT system may provide the setting option for adding the anniversary.

After receiving the signal that the user has selected the display setting option, the MCU 300 in the cluster may compare the obtained current date with the preset holiday data and/or the preset anniversary data to determine whether the current date is the holiday corresponding to the preset holiday data or the current date is the anniversary corresponding to the preset anniversary.

The CPU 200 in the AVNT system is configured to determine whether the date of the holiday among the preset holiday data and/or the date of the anniversary among the preset anniversary data are set as the lunar calendar date or the solar calendar date while comparing the obtained current date with the preset holiday data and/or the preset anniversary data. When it is determined that the date of the holiday and/or the date of the anniversary is set as the lunar calendar date, the CPU 200 in the AVNT system may convert the obtained current date into the lunar calendar date and the MCU 300 in the cluster may compare the converted lunar calendar date with the date of the holiday and/or the date of the anniversary set as the lunar calendar date.

When the MCU 300 in the cluster determines that the current date is the holiday corresponding to the preset holiday data or the current date is the anniversary corresponding to the preset anniversary data, the MCU 300 in the cluster transmits the corresponding signal to the GPU 400 in the cluster, and the GPU 400 in the cluster may display the image related to the holiday or the anniversary of the current date pre-stored in the cluster memory 100 on the display 500 of the cluster.

When the MCU 300 in the cluster determines that the current date is neither the holiday corresponding to the preset holiday data nor the anniversary corresponding to the preset anniversary data, the MCU 300 in the cluster transmits the corresponding signal to the GPU 400 in the cluster, and the GPU 400 in the cluster may display the image related to the current weather pre-stored in the cluster memory 100 on the display 500 of the vehicle.

According to the exemplary embodiment of the present disclosure, the MCU 300 in the cluster may adjust the brightness of the image displayed on the display 500 of the cluster.

Furthermore, the MCU 300 in the cluster may display the traveling speed of the vehicle by controlling the display of the cluster, and additionally may blur the image displayed on the display of the vehicle according to the traveling speed of the vehicle.

The MCU 300 in the cluster may obtain the current traveling speed of the vehicle while blurring the image displayed on the display of the vehicle depending on the traveling speed of the vehicle, determine the blur value, which is numerical value between 0 and 1 according to the traveling speed of the vehicle, and blur the image displayed on the display of the vehicle according to the determined blur value.

The MCU 300 in the cluster may detect the real-time wheel rotation speed from the wheel speed sensor included in an electronic stability controller (ESC), and determine the current traveling speed of the vehicle based on the average value of the real-time wheel rotation speed.

When determining the blur value, which is numerical value between 0 and 1 depending on the traveling speed of the vehicle, if the traveling speed of the vehicle is greater than or equal to the first predetermined threshold and smaller than that second predetermined threshold greater than the first predetermined threshold, the MCU 300 in the cluster is configured to determine the blur value as the ratio (i.e., Blur value=(traveling speed of vehicle−first predetermined threshold)/(second predetermined threshold−first predetermined threshold)) of the difference between the traveling speed of the vehicle and the first predetermined threshold to the difference between the second predetermined threshold and the first predetermined threshold, and when the traveling speed of the vehicle is equal to or greater than the second predetermined threshold, the GPU 400 in the cluster sets the blur value to 1.

For example, the first predetermined threshold may be 0 km/h, the second predetermined threshold may be 100 km/h, and when the traveling speed of the vehicle is 74 km/h, the blur value is 0.74, and when the traveling speed of the vehicle is 100 km/h or more, the blur value is 1.

Effects of the displaying method and the displaying system for the vehicle according to the exemplary embodiments of the present disclosure are as follows.

According to an exemplary embodiment of the present disclosure, it is determined whether the current date is the holiday and/or the anniversary by obtaining the current date and comparing the current date with the preset holiday and/or the anniversary data. When the current date is the holiday and/or the anniversary, the image related to the holiday and/or the anniversary is displayed, and otherwise, the image related to the current weather is displayed. Such images related to the holidays, the anniversaries, and the weather can provide a delicate and interesting visual experience and highlight the atmosphere and environment of the holidays and the anniversaries, satisfying the personalization needs of users. In the emotional aspect, it is possible for users to experience rich and high-quality visual experiences, and provide users with pleasure of driving life by holiday atmosphere and romantic atmosphere. In functional aspect, it is possible to satisfy personalization needs of the users by generating a driver-vehicle interaction with more individualized and friendly GUI experience.

According to the exemplary embodiment of the present disclosure, the displaying system not only is configured for displaying the image to the current user when the current date is the holiday, but is also configured for displaying the image to the user when the current date is the anniversary. Furthermore, each user edits the anniversary data and stores the name and the date of the anniversary in the anniversary data, sharing congratulations between the users.

According to the exemplary embodiment of the present disclosure, the displayed image is blurred or sharpened according to the traveling speed of the vehicle, providing the driver with a unique visual effect and driving experience.

Various embodiments of the present disclosure do not list all possible combinations, but describe representative aspects of the present disclosure. Furthermore, what has been described In various embodiments may be applied independently or in combination of two or more.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various exemplary embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A displaying method for a vehicle, the displaying method comprising:
   obtaining, by a controller, a current date;
   providing, by the controller, a display setting option and receiving a user's selection of the display setting option;
   when the display setting option is selected, comparing, by the controller, the obtained current date with preset holiday data or preset anniversary data to determine whether the current date is a holiday corresponding to the preset holiday data, or determine whether the current date is an anniversary corresponding to the preset anniversary data;
   displaying, by the controller, a pre-stored image related to the holiday or the anniversary of the current date on a display of the vehicle when the controller concludes that the current date is the holiday corresponding to the preset holiday data or the current date is the anniversary corresponding to the preset anniversary data; and
   blurring, by the controller, the pre-stored image displayed on the display of the vehicle according to a traveling speed of the vehicle,
   wherein the blurring the pre-stored image displayed on the display of the vehicle according to the traveling speed of the vehicle includes:
      obtaining a current traveling speed of the vehicle;
      determining a blur value, which is a numerical value between 0 and 1, according to the traveling speed of the vehicle; and
      blurring the pre-stored image displayed on the display of the vehicle according to the determined blur value,
   wherein the determining the blur value, which is the numerical value between 0 and 1, according to the traveling speed of the vehicle includes:
      determining the blur value as a ratio of a difference between the traveling speed of the vehicle and a first predetermined threshold to a difference between a second predetermined threshold and the first predetermined threshold when the traveling speed of the vehicle is greater than or equal to the first predetermined threshold and less than the second predetermined threshold which is greater than the first predetermined threshold; and
      setting the blur value to 1 when the traveling speed of the vehicle is greater than or equal to the second predetermined threshold.

2. The displaying method of claim 1, further including:
   obtaining, by the controller, current weather; and
   displaying, by the controller, a pre-stored image related to the current weather on the display of the vehicle when the controller concludes that the current date is neither the holiday corresponding to the preset holiday data nor the anniversary corresponding to the preset anniversary.

3. The displaying method of claim 1, wherein the preset anniversary data includes at least a name of the anniversary, a date of the anniversary, and whether the date of the anniversary is set as a lunar calendar date or a solar calendar date.

4. The displaying method of claim 3, further including:
   presetting, by the controller, the anniversary data,
   wherein the presetting the anniversary data includes:
      providing an anniversary setting option so that a user receives an operation command for selecting the anniversary setting option;
      providing a setting for inputting the name of the anniversary to receive the name of the anniversary input by the user;
      providing a setting option for selecting whether the anniversary date is stored as the lunar calendar date or the solar calendar date so that the user receives an operation command for selecting whether the anniversary date is the lunar calendar date or the solar calendar date;
      providing a setting for inputting the date of the anniversary to receive the date of the anniversary input by the user; and
      providing a setting option for adding an anniversary.

5. The displaying method of claim 1, wherein the comparing the obtained current date with preset holiday data or preset anniversary data includes:
   determining whether the date of the holiday in the preset holiday data or the date of the anniversary in the preset anniversary data is set as a lunar calendar date or a solar calendar date; and
   converting the obtained current date into the lunar calendar date and comparing the converted lunar calendar date with the date of the holiday or the date of the anniversary set as the lunar calendar date, when the controller concludes that the date of the holiday or the date of the anniversary is set as the lunar calendar date.

6. The displaying method of claim 1, further including adjusting, by the controller, brightness of the pre-stored image displayed on the display of the vehicle.

7. The displaying method of claim 1, further including displaying, by the controller, the traveling speed of the vehicle on the display of the vehicle.

8. A displaying system for a vehicle, the displaying system comprising:
   a memory configured to pre-store an image related to a holiday, an anniversary, or weather; and
   a controller operatively connected to the memory and configured to:
      obtain a current date;
      provide a display setting option to receive a user's selection of the display setting option;
      when the display setting option is selected, compare the obtained current date with preset holiday data or preset anniversary data to determine whether the current date is a holiday corresponding to the preset holiday data or whether the current date is an anniversary corresponding to the preset anniversary data; and
      display a pre-stored image related to the holiday or the anniversary of the current date on a display of the vehicle when the controller concludes that the current date is the holiday corresponding to the preset holiday data or the current date is the anniversary corresponding to the preset anniversary data, wherein the controller is further configured to blur the pre-stored image displayed on the display of the vehicle according to a traveling speed of the vehicle, wherein the controller is further configured to:
- obtain a current traveling speed of the vehicle while blurring the pre-stored image displayed on the display of the vehicle according to the traveling speed of the vehicle;
- determine a blur value, which is a numerical value between 0 and 1, according to the traveling speed of the vehicle; and
- blur the pre-stored image displayed on the display of the vehicle according to the determined blur value, and wherein, when calculating the blur value, which is the numerical value between 0 and 1, according to the traveling speed of the vehicle, the controller is further configured to:
- determine the blur value as a ratio of a difference between the traveling speed of the vehicle and a first predetermined threshold to a difference between a second predetermined threshold and the first predetermined threshold when the traveling speed of the vehicle is greater than or equal to the first predetermined threshold and less than the second predetermined threshold which is greater than the first predetermined threshold; and
- set the blur value to 1 when the vehicle speed is equal to or greater than the second predetermined threshold.

9. The displaying system of claim 8, wherein the controller is further configured to:
- obtain current weather; and
- display a pre-stored image related to the current weather on the display of the vehicle when the controller concludes that the current date is neither the holiday corresponding to the preset holiday data nor the anniversary corresponding to the preset anniversary.

10. The displaying system of claim 8, wherein the preset anniversary data includes at least a name of the anniversary, a date of the anniversary, and whether the date of the anniversary is set as a lunar calendar date or a solar calendar date.

11. The displaying system of claim 10, wherein, when presetting the anniversary data, the controller is further configured to:
- provide an anniversary setting option so that a user receives an operation command for selecting the anniversary setting option;
- provide a setting for inputting the name of the anniversary to receive the name of the anniversary input by the user;
- provide a setting option for selecting whether the anniversary date is stored as the lunar calendar date or the solar calendar date so that the user receives an operation command for selecting whether the anniversary date is the lunar calendar date or the solar calendar date;
- provide a setting for inputting a date of the anniversary to receive a date of the anniversary input by the user; and
- provide a setting option for adding the anniversary.

12. The displaying system of claim 8, wherein the controller is further configured to:
- determine whether the date of the holiday in the preset holiday data or the date of the anniversary in the preset anniversary data is set as a lunar calendar date or a solar calendar date;
- convert the obtained current date into the lunar calendar date when the controller concludes that the date of the holiday or the date of the anniversary is set as the lunar calendar date; and
- compare the converted lunar calendar date with the date of the holiday or the date of the anniversary set as the lunar calendar date.

13. The displaying system of claim 8, wherein the controller is further configured to adjust brightness of the pre-stored image displayed on the display of the vehicle.

14. The displaying system of claim 8, wherein the controller is further configured to control the display of the vehicle to display the traveling speed of the vehicle.

* * * * *